Aug. 18, 1931. S. T. THORPE ET AL 1,819,723

FISHING REEL

Filed Feb. 7, 1929 2 Sheets-Sheet 1

Inventors
Samuel T. Thorpe and
Louis Zipp
By Church & Church
their Attorneys

Aug. 18, 1931.  S. T. THORPE ET AL  1,819,723
FISHING REEL
Filed Feb. 7, 1929   2 Sheets-Sheet 2
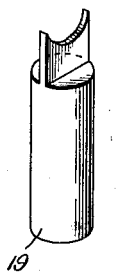
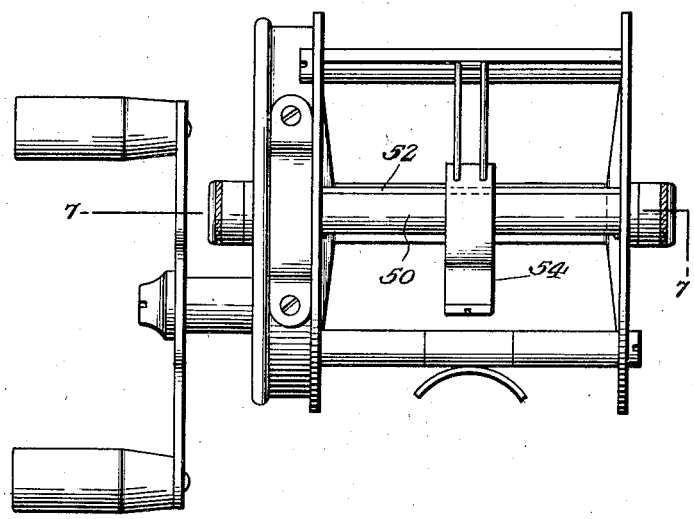
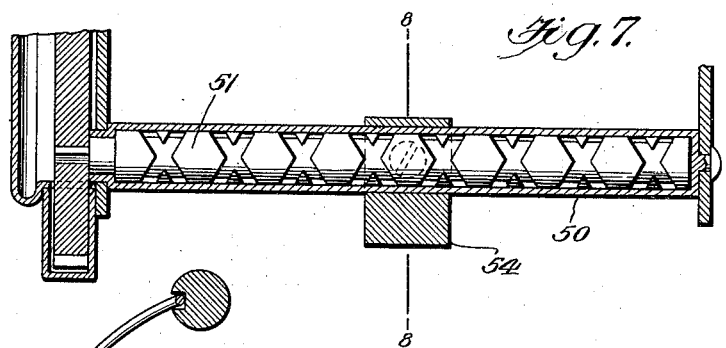
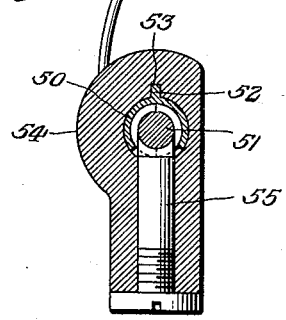
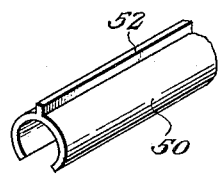

Patented Aug. 18, 1931

1,819,723

UNITED STATES PATENT OFFICE

SAMUEL T. THORPE AND LOUIS ZIPP, OF BRISTOL, CONNECTICUT, ASSIGNORS TO THE HORTON MANUFACTURING COMPANY, OF BRISTOL, CONNECTICUT, A CORPORATION OF CONNECTICUT

FISHING REEL

Application filed February 7, 1929. Serial No. 338,169.

This invention relates to improvements in fishing reels and particularly to level wind devices now generally found in these articles.

Broadly, the invention seeks to simplify the construction of the level wind device by reducing the number of parts to a minimum. In the preferred embodiment of the invention, the device is also so constructed that the carriage for guiding the fishing line can be easily removed without in any way disturbing any other portions of the reel. Stated generally, this feature of the invention consists in forming the line guide carriage of separable sections slidably mounted on a guide bar fixed in the reel frame. To remove the carriage, it is only necessary to detach the sections of the carriage, one from the other, the remainder of the reel being unaffected.

With these and other objects in view the invention consists in certain novel details of construction, and combinations and arrangements of parts, all as will hereinafter be more fully described and the novel features thereof particularly pointed out in the appended claims.

In the accompanying drawings:—

Fig. 3 is a sectional view on the line 3—3 of Fig. 2;

Figs. 4 and 5 are detailed views of the line guide carriage;

Fig. 6 is an elevational view of a modified form of level winding device;

Fig. 7 is a sectional view on the line 7—7 of Fig. 6;

Fig. 8 is a sectional view on the line 8—8 of Fig. 7; and

Fig. 9 is a perspective view of the tubular bar encasing the traversing shaft in the modified form of the invention.

Figure 1:
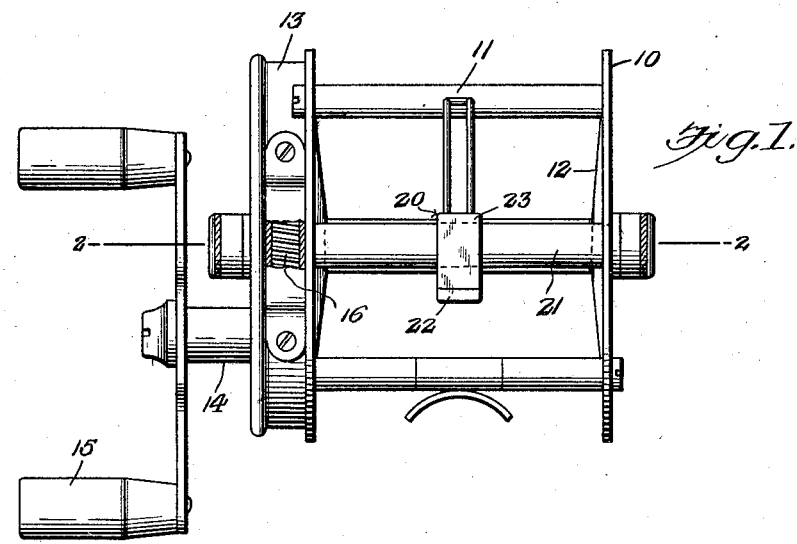
Figure 1 is an elevational view of a reel embodying the present invention.

As the present invention relates especially to the level winding device, the reel proper need not be described in detail. It may be of any desired construction, the present illustration showing the frame comprising the end plates 10 and spacer bars 11 with the spool 12 journaled in said plates. The gearing for driving the spool is enclosed in the usual housing 13 through which extends the shaft 14 carrying handle 15. Said gearing also embodies a gear 16 mounted on the traversing shaft 17 of the level winding device. Gear 16 is adapted to also be enclosed. Shaft 17, as is ordinary in these level wind devices, is formed with oppositely disposed spiral grooves 18 adapted to co-act with a driving pawl 19 for actuating the line guide carriage 20.

Figure 2:
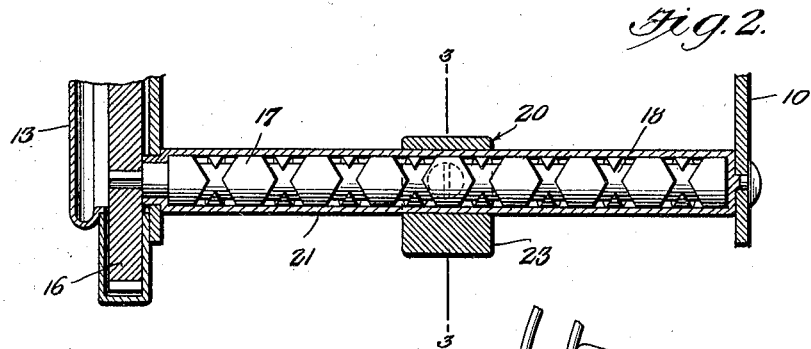
Fig. 2 is a sectional view on the line 2—2 of Fig. 1, the winding device only being illustrated.
Figures 3, 4:
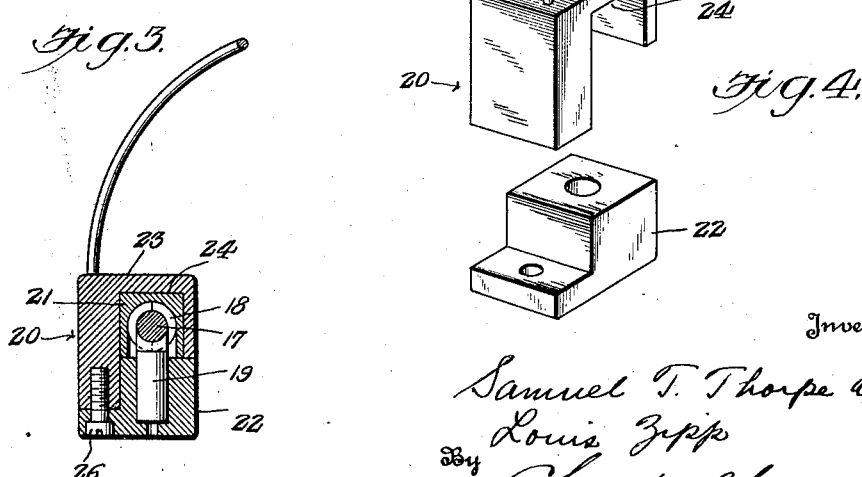

Heretofore, the line guide carriages of level winding devices have been so mounted that considerable difficulty has been encountered in removing it for the purpose of replacing the driving pawl. Usually, it is necessary to disassemble the reel itself to a great extent. Not only is this inconvenient at times, especially if a fishing line is on the reel, but some of the parts are so small that they are easily misplaced or dropped and lost. To eliminate this feature, the present invention as illustrated in Figs. 1 to 5 consists in having the carriage 20 directly demountable from its guide bar 21. This is accomplished by having the carriage formed of separable sections 22, 23 one of which carries the driving pawl 19, and both of which may be detachably secured together around said bar. Said sections 22, 23 may be of various shapes but in the present instance section 23, which may be termed the body portion, has a slot 24 therein so as to be placed on the bar, while section 22, carrying the pawl constitutes an end portion for closing said slot. The two sections, when thus assembled are secured together by a screw 26. End section 22 has an orifice therein which may be used for lubricating purposes or for ejecting the pawl when the carriage is removed. With this arrangement, if anything should happen to render the pawl inoperative while the reel is in use, the carriage may be demounted and a new pawl substituted without taking any members of the reel apart or the carriage may be taken off and the reel used with the attachment.

So far as the foregoing feature of demountability of carriage 20 is concerned, the guide bar 21 may be of any desired shape and be placed in any desired position. However, for the sake of simplicity, it is preferred that the bar serve as a housing for traversing shaft 17 and in order that a steadying bar for the carriage may be eliminated, said guide bar is made of an irregular cross-section—such as will prevent the carriage rocking on it. In the device of Figs. 1 to 5, said guide bar is tubular and of rectangular cross section although other shapes, except circular bars, may be used.

For instance, in the modification shown in Figs. 6 to 8, the bar 50 encasing the traversing shaft 51 is substantially circular in cross section, but is formed with a longitudinally extending rib 52 engaging in a recess 53 in the carriage 54. In this instance, however, the carriage is not demountable except by partially disassembling the reel. This is a one-piece carriage carrying the driving pawl 55, although a sectional carriage such as shown in Figs. 1 to 5 could be utilized. The remaining portions of the reel in this instance are similar to the construction shown in Figs. 1 to 5 and a detailed description is believed unnecessary.

What we claim is:

1. In a fishing reel, the combination of a frame, a spool, a traversing shaft, a guide bar partially surrounding said shaft, a line guide carriage slidable on said guide bar, said carriage surrounding said bar but being removable therefrom and said carriage being held against rotation by said bar, and driving connections comprising a pawl between said carriage and shaft said pawl being held spaced from said guide bar.

2. In a fishing reel, the combination of a frame, a spool, a traversing shaft, a tubular guide bar partially surrounding said shaft, a line guide carriage slidably supported on said bar, said bar being of non-cylindrical cross-section whereby rotation of the carriage thereon is prevented, and driving connections comprising a pawl between said carriage and shaft, said pawl being held spaced from said guide bar.

3. In a fishing reel, the combination of a frame, a spool, a traversing shaft, a tubular bar rectangular in cross-section enclosing said shaft, said bar being open at one side, a line guide carriage slidable on said bar but non-rotatable thereon; and a pawl carried in said carriage and projecting through the open side of said bar into driving engagement with said shaft said pawl being held spaced from the walls of the opening in said bar.

4. In a fishing reel, a frame, a spool, a traversing shaft, a tubular bar rectangular in cross-section around said shaft, said bar being open at one side, a line guide carriage formed of a body portion and a separable end portion, said body portion having a slot therein to receive said bar, means for securing said end portion to said body portion to close said slot, and a pawl carried by said carriage projecting through the open side of said bar into engagement with said shaft.

5. In a fishing reel, a frame, a spool, a traversing shaft, a tubular bar rectangular in cross-section around said shaft and having a slot extending longitudinally thereof, a line guide carriage slidably mounted on said bar but non-rotatable with respect thereto and a pawl secured in said carriage, co-acting with said shaft, said pawl being held spaced from the walls of said slot said carriage being formed of separable sections to permit ready removal of the same from said bar.

6. In a fishing reel, a frame, a spool, a traversing shaft, a tubular bar of non-cylindrical cross-section around said shaft and having a longitudinally extending slot therein, a line guide carriage formed of a body portion slidable longitudinally on said bar and a separable end portion for securing said body portion on the bar, and a pawl mounted in said separable end portion co-acting with said traversing shaft said pawl projecting through said slot in spaced relation to the walls thereof and said carriage being non-rotatable on said bar.

7. In a fishing reel, a frame, a spool, a traversing shaft, a tubular bar around said shaft, a line guide carriage slidable on said bar but non-rotatable thereon, said bar being the sole support for said carriage and said carriage being formed of separable sections to permit removal from said bar, and a pawl in said carriage engaging said shaft said pawl being permanently held against engagement with said bar.

8. In a fishing reel, a frame, a spool, a traversing shaft, a guide bar, a line guide carriage slidable on said bar but non-rotatable thereon, said carriage being formed of separable sections embracing said bar whereby said carriage may be dismounted by separation of said sections, and a pawl in said carriage co-acting with said shaft said pawl being permanently held against engagement with said bar.

9. In a fishing reel, a frame, a spool, a traversing shaft, a guide bar, a line guide carriage slidable on said bar but non-rotatable thereon, said carriage comprising one portion extending partially around the bar and a second portion detachably secured to the first mentioned portion for retaining the carriage on the bar, and a pawl in said carriage co-acting with said shaft said pawl being permanently held against engagement with said bar.

SAMUEL T. THORPE.
LOUIS ZIPP.